(12) United States Patent
Abolhassani et al.

(10) Patent No.: US 8,279,640 B2
(45) Date of Patent: Oct. 2, 2012

(54) MODULAR MULTI-PULSE TRANSFORMER RECTIFIER FOR USE IN SYMMETRIC MULTI-LEVEL POWER CONVERTER

(75) Inventors: Mehdi Abolhassani, Austin, TX (US);
Ryan Edwards, Round Rock, TX (US);
Thomas Keister, Georgetown, TX (US);
Alex Skorcz, Cedar Park, TX (US);
Enrique Ledezma, Austin, TX (US);
Chao Hsu Liao, Wuxi Jiangsu (CN)

(73) Assignee: TECO-Westinghouse Motor Company, Round Rock, TX (US)

( * ) Notice: Subject to any disclaimer, the term of this patent is extended or adjusted under 35 U.S.C. 154(b) by 1043 days.

(21) Appl. No.: 12/284,649

(22) Filed: Sep. 24, 2008

(65) Prior Publication Data

US 2010/0073970 A1    Mar. 25, 2010

(51) Int. Cl.
*H02M 5/45* (2006.01)
(52) U.S. Cl. ............................................ 363/37; 363/65
(58) Field of Classification Search ............... 649/34, 649/37, 65, 71, 95, 98, 131, 132; 363/34, 363/37, 65, 71, 95, 98, 131, 132
See application file for complete search history.

(56) References Cited

U.S. PATENT DOCUMENTS

| | | | |
|---|---|---|---|
| 2,261,727 A * | 11/1941 | Kubler | ............... 363/69 |
| 3,581,212 A | 5/1971 | McMurray | |
| 3,867,643 A | 2/1975 | Baler et al. | |
| 4,052,657 A | 10/1977 | Kleiner et al. | |
| 4,674,024 A | 6/1987 | Paice et al. | |
| 5,619,407 A | 4/1997 | Hammond | |
| 5,625,545 A | 4/1997 | Hammond | |
| 5,638,263 A | 6/1997 | Opal et al. | |
| 5,734,565 A | 3/1998 | Mueller et al. | |
| 5,790,396 A | 8/1998 | Miyazaki et al. | |
| 5,841,645 A | 11/1998 | Sato | |
| 5,986,909 A | 11/1999 | Hammond et al. | |
| 6,005,788 A | 12/1999 | Lipo et al. | |
| 6,014,323 A | 1/2000 | Aiello et al. | |
| 6,031,738 A | 2/2000 | Lipo et al. | |
| 6,150,731 A | 11/2000 | Rinaldi et al. | |
| 6,166,513 A | 12/2000 | Hammond | |
| RE37,126 E | 4/2001 | Peng et al. | |
| 6,229,722 B1 * | 5/2001 | Ichikawa et al. | ............... 363/71 |
| 6,236,580 B1 | 5/2001 | Aiello et al. | |
| 6,262,555 B1 | 7/2001 | Hammond et al. | |
| 6,301,130 B1 * | 10/2001 | Aiello et al. | ............... 363/37 |
| 6,320,767 B1 | 11/2001 | Shimoura et al. | |
| 6,340,851 B1 | 1/2002 | Rinaldi et al. | |

(Continued)

OTHER PUBLICATIONS

Reply to Office Action mailed Dec. 22, 2010 filed on Mar. 22, 2011 in U.S. Appl. No. 12/890,959.

(Continued)

*Primary Examiner* — Nguyen Tran
(74) *Attorney, Agent, or Firm* — Trop, Pruner & Hu, P.C.

(57) ABSTRACT

In one embodiment, a system may include multiple transformers each to provide an output to one or more power cells, where the power cells provide AC power to a load. Each transformer may have at least one primary winding and multiple secondary windings, where the primary winding of each transformer is phase shifted with respect to its neighboring transformers and the secondary windings are also phase shifted. The phase shift of the primary winding can be based on the phase shift of the secondary windings and a number of the plurality of transformers.

19 Claims, 10 Drawing Sheets

U.S. PATENT DOCUMENTS

| | | | |
|---|---|---|---|
| 6,377,478 | B1 | 4/2002 | Morishita |
| 6,392,907 | B1 | 5/2002 | Ichikawa |
| 6,621,719 | B2 | 9/2003 | Steiner et al. |
| 6,653,744 | B2 | 11/2003 | Stricker |
| 6,697,271 | B2 | 2/2004 | Corzine |
| 6,898,095 | B2 | 5/2005 | Bijlenga et al. |
| 7,088,073 | B2 | 8/2006 | Morishita |
| 7,164,201 | B2 | 1/2007 | Manz et al. |
| 7,190,070 | B2 | 3/2007 | Manz et al. |
| 7,242,584 | B2 | 7/2007 | Kroneder |
| 7,428,158 | B2 * | 9/2008 | Bousfield et al. ............... 363/65 |
| 7,508,147 | B2 | 3/2009 | Rastogi et al. |
| 7,830,681 | B2 | 11/2010 | Abolhassani et al. |
| 2007/0064366 | A1 | 3/2007 | Hammond |
| 2008/0079314 | A1 | 4/2008 | Hammond |
| 2008/0081244 | A1 | 4/2008 | Hammond |
| 2008/0088186 | A1 | 4/2008 | Hammond |
| 2009/0021922 | A1 | 1/2009 | Popp et al. |

OTHER PUBLICATIONS

U.S. Patent and Trademark Office, Office Action mailed Dec. 22, 2010 in U.S. Appl. No. 12/890,959.

Dr. Keith Corzine, "Operation and Design of Multilevel Inverters," Developed for the Office of Naval Research, Dec. 2003, Revised Jun. 2005, pp. 1-79.

U.S. Appl. No. 12/495,359, filed Jun. 30, 2009 entitled, "Pluggable Power Cell for an Inverter," by Enrique Ledezma, et al.

U.S. Appl. No. 12/317,957, filed Dec. 31, 2008 entitled, "Partial Regeneration in a Multi-Level Power Inverter," by Mehdi Abolhassani, et al.

U.S. Appl. No. 12/495,385, filed Jun. 30, 2009 entitled, "Providing Modular Power Conversion," by Enrique Ledezma, et al.

International Searching Authority, PCT Notification of Transmittal of International Search Report and Written Opinion dated May 7, 2010, in international application No. PCT/US2009/057938.

* cited by examiner

MODULAR MULTI-PULSE TRANSFORMER RECTIFIER FOR USE IN SYMMETRIC MULTI-LEVEL POWER CONVERTER

BACKGROUND

Generally, equipment referred to as a power converter, inverter or drive is used to provide power to another piece of equipment such as a motor. Specifically, such a converter (converter is used generally herein to refer to converters, inverters and drives) is coupled to a utility connection to receive incoming input power such as three-phase AC power. The converter conditions the power to provide a conditioned power signal to the equipment to be powered. In this way, incoming power to the equipment may be of improved efficiency, leading to reduced costs to operate the equipment.

Multi-level power converters have been gaining popularity mainly due to improved power quality, lower switching losses, better electromagnetic compatibility, and higher voltage capability. These improvements in power conversion are achieved by using a multiple voltage step strategy. One common multi-level inverter topology is a series H-bridge inverter, in which multiple H-bridge inverters are connected in series. Since this topology consists of series power conversion cells, the voltage and power level may be easily scaled.

However, this topology requires a large number of isolated DC voltage sources to supply each cell. The common practice is to use an isolation transformer to supply a rectifier of a power cell. However, the supply current to the rectifier contains many harmonic current components which are very disturbing for equipment and power systems, and cause electromagnetic interference (EMI).

Some systems use a single-stage transformer with multiple phase-shifted secondary windings. However, harmonics cancellation in a single-stage transformer can not be optimized. The main obstacle to doing this is the manufacturing process and less degree of freedom because of less number of turn, which makes it very difficult to implement the small phase shift angles required for efficient and optimized harmonics cancellation.

SUMMARY OF THE INVENTION

In one aspect, the present invention is directed to a medium voltage drive system that includes modular transformers. The system may include multiple transformers each to provide an output to one or more power cells, where the power cells provide AC power to a load. Each transformer may have at least one primary winding and multiple secondary windings, where the primary winding of each transformer is phase shifted with respect to its neighboring transformers and the secondary windings are also phase shifted. In one implementation, the phase shift of the primary winding is based on the phase shift of the secondary windings and a number of the plurality of transformers. As one example, there may be three modular transformers, and the system acts as a 54-pulse transformer. In some implementations, in addition to the phase-shifted transformers, one or more non-phase-shifted transformers may also be present to provide an output to at least one power cell.

Another aspect of the present invention is directed to a system with multiple modular transformers each including at least one phase-shifted primary set of windings to receive power from a utility connection and multiple secondary sets of windings. In addition, the system includes power cells each coupled to one of the secondary sets of windings of one of the modular transformers. The power cells are configured such that a first subset of the power cells are coupled to a first phase output line, a second subset of the power cells are coupled to a second phase output line, and a third subset of the power cells are coupled to a third phase output line. Each modular transformer provides an output to a first number of power cells of a pair of the three phase output lines and a second number of power cells of a last of the phase output lines. Further, any of the power cells can be coupled to any of the secondary sets of windings of any of the modular transformers.

In one implementation, each transformer provides the output to the first number of power cells of a different pair of the three phase output lines. For example, a first modular transformer can provide outputs to a first power cell of the first and second phase output lines, and to two power cells of the third phase output line.

Yet another aspect of the present invention is directed to a system with multiple transformers each to provide an output to at least one power cell coupled to at least one phase output line and configured to provide AC power to a load. Each transformer may include at least one primary winding and a plurality of secondary windings, where the primary winding of each transformer is phase shifted with respect to its neighboring transformers, and the secondary windings are phase shifted with respect to the other secondary windings of the corresponding transformer. In addition, the system further includes a non-phase-shifted transformer to provide an output to at least one second power cell. Such second power cell(s) may be configured to perform partial regeneration from the load. To this end, the second power cell(s) include an active front end coupled to an output of its corresponding secondary winding(s). A controller may be coupled to at least the second power cell(s) to control switching of the active front end.

DETAILED DESCRIPTION

Embodiments may provide modular transformers with multiple phase-shifted windings to achieve the highest power quality at a utility connection while providing scalability and modularity for various inverter topologies such as a series H-bridge inverter. More specifically, in various implementations both a primary winding and secondary windings of each modular transformer can be phase shifted. Specific implementations of such phase shifting will be discussed below. Thus, each modular transformer has a primary winding that is phase shifted, at least with respect to its neighboring transformers.

By providing modular transformer technology with appropriate phase shifting in both secondary windings and primary windings, the most troublesome harmonics in the utility side of the multi-level inverter can be eliminated. Further, by providing modular transformer configurations, the need for having a single large transformer, which can be difficult to manufacture, install, and package can be eliminated.

In various implementations, each transformer has at least one set of primary windings and at least one set of secondary windings where each set corresponds to multi-phase windings (e.g., three-phase windings). As used herein, a winding generally can refer to a set of windings (e.g., a set of secondary windings coupled to a three-phase power cell). Both primary and secondary windings may be phase-shifted for optimum harmonics cancellation. The amount of phase shift of secondary and primary windings can be calculated according to the following equations:

$$N_s = \frac{N_{dc}}{N_T} \quad [EQ. 1]$$

$$\alpha_{sec} = \frac{360}{2 \cdot N_{ph} N_s} \quad [EQ. 2]$$

$$\alpha_{prim} = \frac{\alpha_{sec}}{N_T} \quad [EQ. 3]$$

where $N_T$ is the number of transformer modules; $N_{dc}$ is the number of isolated DC sources; $N_S$ is an integer number of the number of secondary windings in each transformer; $N_{ph}$ is the number of phases of a supply; $\alpha_{sec}$ is the secondary windings phase shift in each module; and $\alpha_{prim}$ is the primary winding phase shift in each module.

For example, if the number of required isolated DC sources is $N_{dc}=9$ with $N_T=3$ transformer modules (and assuming a three-phase supply), the phase shift between secondary windings of each transformer can be calculated as: $N_S=9/3=3$; and $\alpha_{sec}=360/18=20°$. In turn, the primary winding phase shift (between each transformer) can be calculated as: $\alpha_{prim}=20/3=6.7°$.

Figure 1:
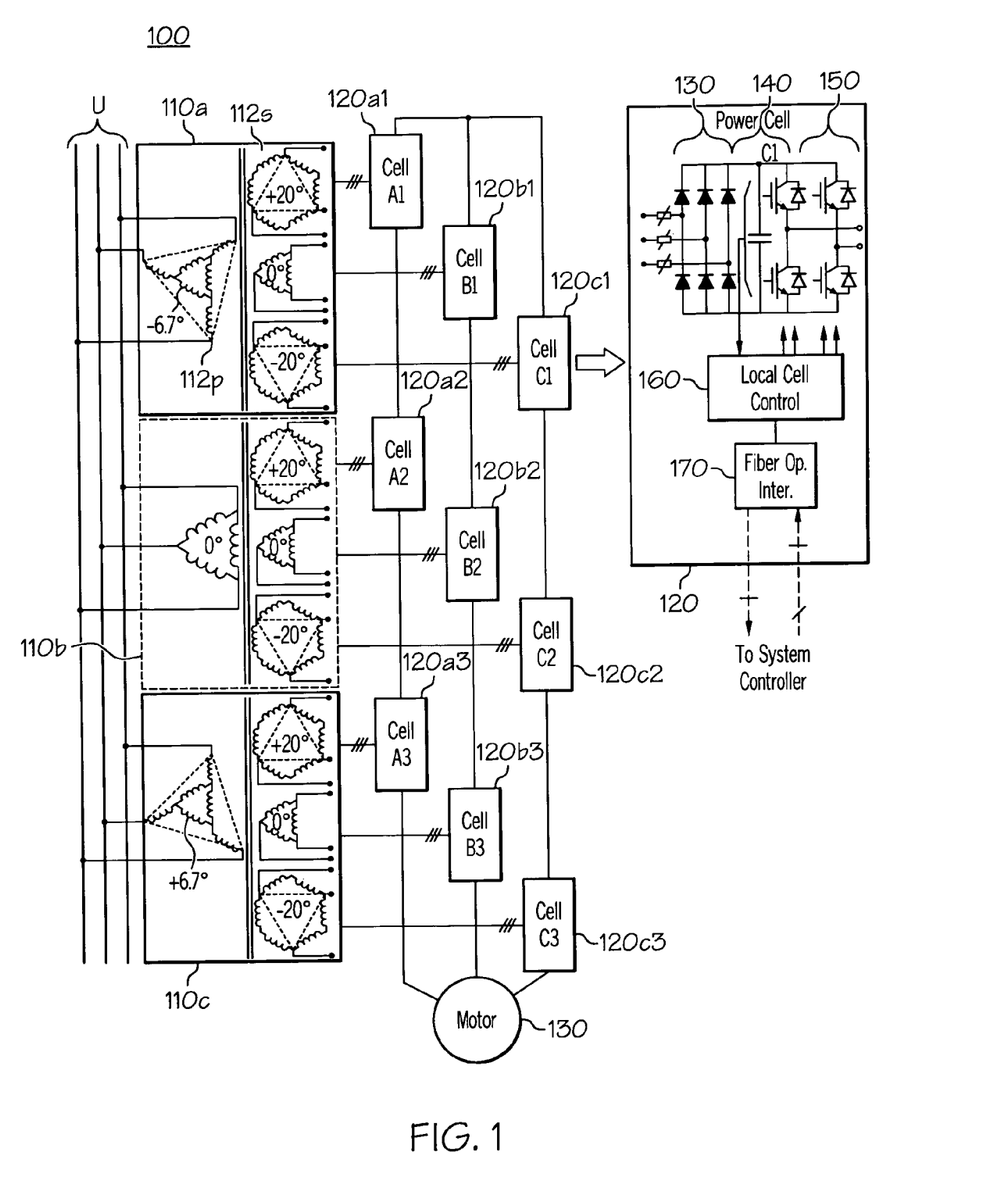
FIG. 1 is a block diagram of a power converter in accordance with one embodiment of the present invention.

Referring now to FIG. 1, shown is a block diagram of a power converter in accordance with one embodiment of the present invention. As shown in FIG. 1, system 100 includes a plurality of modular transformers 110$_a$-110$_c$ (generically transformer 110). As shown, each transformer 110 is coupled to a utility connection U, which provides three-phase power to the transformers. In turn, each transformer 110 includes a primary winding 112$_p$ and a plurality of secondary windings 112$_s$ (note that for ease of illustration such reference numerals are only indicated for first transformer 110$_a$).

Each primary transformer 110 has its primary coil 112$_p$ phase shifted with respect to its neighboring transformers. In the particular implementation shown, first transformer 110$_a$ has its primary winding 112$_p$ at a phase shift of −6.7°, second transformer 110$_b$ has its primary winding at 112$_p$ at 0°, and third transformer 110$_c$ has its primary winding 112$_p$ with a phase shift of +6.7°. The phase shifts for this configuration may be obtained using Equations 1-3 above. Thus, given a particular number of DC sources (i.e., power cells), and a given number of transformers $N_T$ and supply phases, the phase shift of the primary and secondary coils can be determined.

As further shown in FIG. 1, each transformer 110 includes a plurality of secondary windings 112$_s$ that are also phase shifted. In the implementation shown in FIG. 1, each of the secondary windings is phase shifted by 20°.

The outputs of each of the secondary windings 112$_s$ thus provide three-phase AC power to a corresponding power cell 120$_{a1}$-120$_{c3}$. Note that power cells 120$_{a1}$-120$_{a3}$ are coupled in series as a phase output line P1 that provides power of a first phase to a motor 130. Similarly, power cells 120$_{b1}$-120$_{b3}$ provide power of a second phase to its phase output line P2 coupled to motor 130. In turn, power cells 120$_{c1}$-120$_{c3}$ provide power of a third phase to its phase output line P3 coupled to motor 130.

The modular transformers may be manufactured using transformer manufacturing techniques and implementing various types of winding designs for both primary and secondary windings. In the implementation shown in FIG. 1, the primary windings include both extended delta configurations and a standard delta configuration. However, the connection of primary and secondary windings can be freely chosen. In various implementations, a desired phase shift may be realized by changing the geometry of the winding, e.g., by adjusting the number of turns of one or more coils of the transformer or taps with regard to other coils. By controlling the number of turns of coils and connection method of them, a given phase shift can be realized. As shown in the implementation of FIG. 1, secondary windings can include standard delta configurations, as well as polygon configurations, where again by changing the size and/or turns of one or more coils, different phase shifts can be obtained. Of course, other configurations or connections can be used to realize a desired phase shift in different implementations. Having the phase shift in primary windings as well as secondary windings of transformer modules, the manufacturing process can be eased, as realizing small phase angles (e.g., 4° for a 90-pulse transformer to supply 15 power cells) in secondary windings is not needed. The main obstacle to implement the small phase shift in secondary windings is the smaller number of turns in secondary windings (LV side) relative to primary windings (HV side). The fewer number of turns in secondary windings gives less freedom to realize the smaller phase shift angles.

In various implementations, each modular transformer supplies isolated three phase power to one or more power cells of the same voltage of each phase output line. By separating a transformer into modular units, there is more surface area for the core and thus it can dissipate heat more effectively. Further, each modular core volume may reduce in size since the winding window may only need to accommodate one or a small number of secondary windings per output phase. Besides, using modular transformers will benefit packaging of the inverter. However, the core cross sectional area may be substantially the same as a single transformer implementation to ensure an equivalent flux density. Also, the secondary copper windings can be of the same wire gauge since the current density will remain constant. So while the mean flux path may be shorter for a modular core, the combined volume between all modular cores will be greater than the volume of a single transformer.

The modular approach allows a single unit transformer to be used across a wide voltage and power range. By increasing the number of modular units, a converter in accordance with an embodiment of the present invention is capable of higher voltage and power with lower harmonic distortion. Modular units can easily be removed to reduce cost and efficiently accommodate lower voltages. In contrast, a conventional transformer would have to be completely redesigned for different ratings. Instead, by providing a modular transformer more vendors can be capable of manufacturing such a smaller transformer.

Modular transformers in accordance with an embodiment of the present invention can provide a variety of benefits, including better harmonics cancellation and reliability. As to harmonics cancellation benefits, these modular transformers can provide improved power quality in the utility, as by the phase-shifting of the primaries and secondaries, a N-pulse output can be obtained having a harmonic distortion in utility current of less than the requirements of the IEEE 519 standard. Such harmonic levels far exceed that possible with a single transformer, as the mechanical tolerances on the careful phase angles needed for such a system cause higher harmonic distortion. Furthermore, the modular transformers may be all of a common voltage and current level to thus cancel harmonics due to the balancing of the outputs.

Still further, modular transformers can provide advances in reliability as various concerns inherent in a single transformer can be avoided by providing multiple smaller modular transformers. For example, concerns regarding winding-to-winding shorts can be reduced by isolating the multiple secondaries in different modular transformers. Furthermore, thermal effects such as a skin effect caused by having other windings configured over inner windings can be removed. Still further, by providing smaller separate modular transformers, an avalanche of failures can be avoided. More so, by having the multiple transformers, in the case of a failure of one transformer, the remaining transformers can allow continued system operation, albeit at a possibly lower performance level. Embodiments may further include various bypass or switch over mechanisms to enable such dynamic removal of one or more transformers in the case of such a failure. Also, by having modular transformers, leakage fluxes are reduced as compared to a single transformer with many secondaries. Smaller leakage flux will account for better utilization of iron and smaller core losses.

As shown in FIG. 1, each transformer 110 has a three phase input with isolated three phase secondary outputs. Primary windings $112_p$ of each transformer may have taps that enable phase rotation with respect to other modular transformers 110. Such phase rotation may be in accordance with Equation 3, above. The turns ratio between primary and secondary can be individually selected for the desired output voltage level. In implementations for an asymmetric configuration, the turns ratios for one or more of the transformers may differ, to accommodate different output voltages.

FIG. 1 also shows a method of implementation of one of the power cells 120. Note that each such power cell may be formed of the same topology. Specifically, power cell 120 may be coupled to receive incoming power from a given modular transformer that is rectified via a rectifier 130, which may be formed of a parallel implementation of diodes. Coupled to rectifier 130 is a power storage unit 140, which may include one or more storage capacitors. In turn, a switching stage 150, which may be a so-called H-bridge implementation may include a plurality of switching elements Q1-Q4, which may take the form of power transistors such as insulated gate bipolar transistors (IGBTs). Switching transistors may be protected by parallel coupled anti-diodes D1-D4. Switching of switching elements Q1-Q4 may be implemented according to a local cell controller 160, which in turn may receive control signals via a fiber optic interface 170 from a system controller. While shown with this particular implementation in the embodiment of FIG. 1, the scope of the present invention is not limited in this regard.

In the example of FIG. 1, each module transformer is an 18-pulse transformer. However, by applying the phase-shift in the primary winding of the modular transformer, it acts as a 54-pulse transformer. Thus while only three modular transformers are provided, each having a single primary winding and three secondary windings, the harmonic cancellation of a 54-pulse transformer is realized. While shown in FIG. 1 as having secondary windings being configured as delta or extended polygon connections and primary windings configured as delta or extended delta connections, the scope of the present invention is not so limited. In other implementations, the secondary and primary windings can be connected in extended star, zigzag, extended delta and polygon configurations as well.

Furthermore, understand that in some implementations an inverter formed of multiple modular transformers and corresponding power cells may include at least one transformer that is not phase shifted. However, the power cells receiving power from such an unphase-shifted transformer may be controlled using electronic means to enable a relatively harmonic distortion-free sine wave output. Thus, some embodiments may enable a combination of active and passive rectifiers. Namely, the phase-shifted transformers may provide for passive phase rectifiers such as diode rectifiers, while active phase shifting, such as in the form of front end switching mechanisms of power cells coupled to a non-phase shifted transformer, can enable an equivalent control of an inverter. Thus in such instances, an equivalent N-pulse inverter can be realized using a combination of phase-shifted and non-phase-shifted transformers.

Furthermore, understand that while shown in a three-phase system in the embodiment of FIG. 1, modular transformers can be used in various multi-phase systems, such as systems having greater than three phases (both at input and output sides) such as a five-phase, six-phase, nine-phase and so forth. In such systems, similar configurations of transformers and power cells can be implemented.

Figure 2:
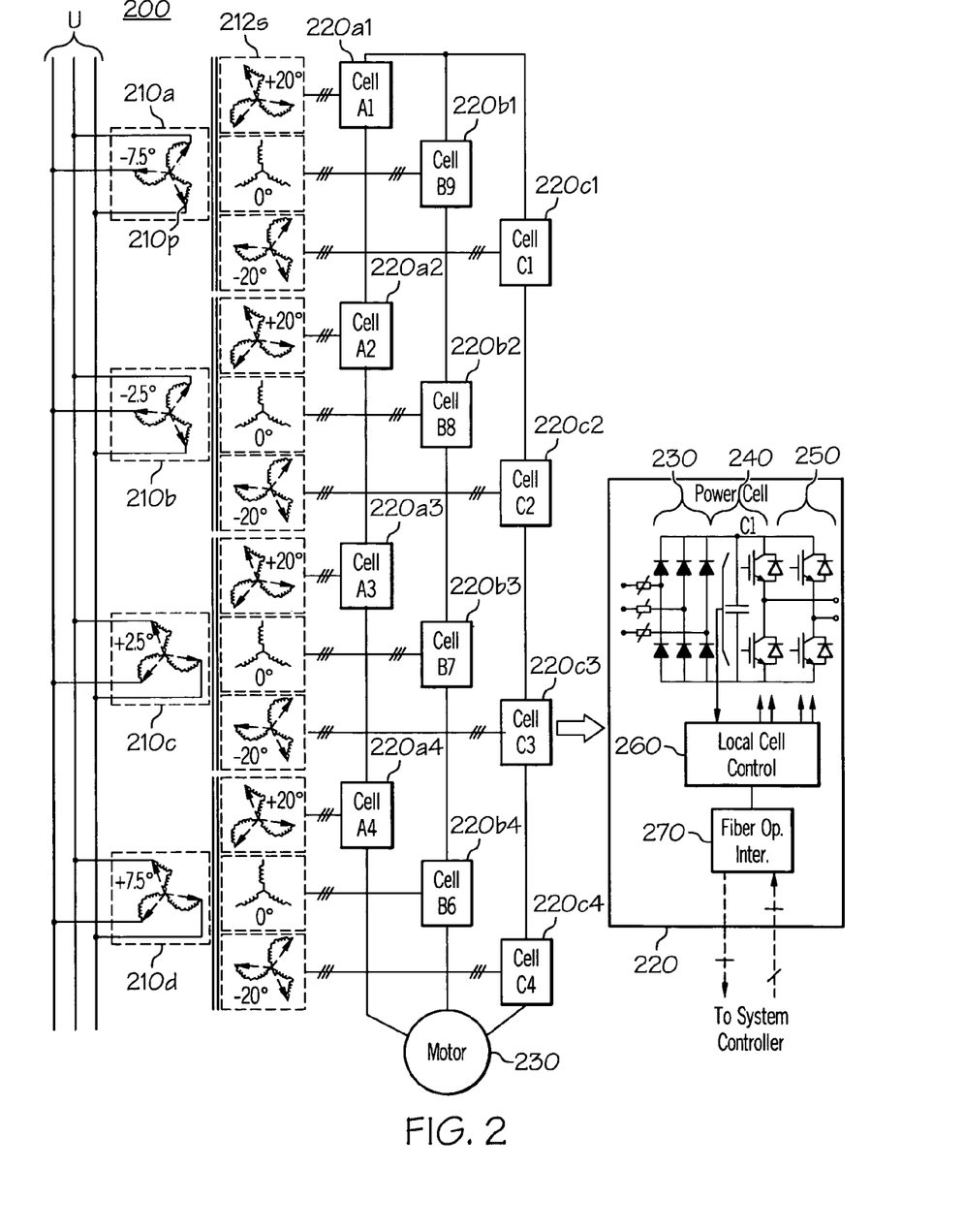
FIG. 2 is a block diagram of a power converter in accordance with another embodiment of the present invention.

Referring now to FIG. 2, shown is a block diagram of a power converter in accordance with another embodiment of the present invention. As shown in FIG. 2, system 200 includes four modular transformers $210_a$-$210_b$, each of which has a single primary $212_p$ and three secondary windings $212_s$. In the implementation of FIG. 2, the primary windings may be phase shifted with respect to each other by 5° and each may be formed of an extended Y configuration. Note that the phase shifts shown for the primary windings in FIG. 2 are such that a substantial midpoint between the modular transformers (i.e., between the middle two modular transformers) may be at a 0° phase shift such that the middle two transformers have primary windings at a phase shift of +2.5° and −2.5°, respectively.

In turn, the secondary windings $212_s$ of each transformer may have a phase shift of 20° and may be formed of Y or extended Y configurations. Thus in system 200, modular transformers $210_a$-$210_d$ can power 12 isolated DC sources, namely power cells $220_{a1}$-$220_{c4}$. In the embodiment of FIG. 2, each power cell may be adapted the same as that of the power cells in FIG. 1. Thus in the implementation of FIG. 2, the system may act as a 72-pulse transformer. Note that the selected phase angles in the implementation of FIG. 2 may be determined in accordance with Equations 1-3 such that $N_s$ is 3, $\alpha_{sec}$ is 20°, and $\alpha_{prim}$ is 5°.

Figure 3:
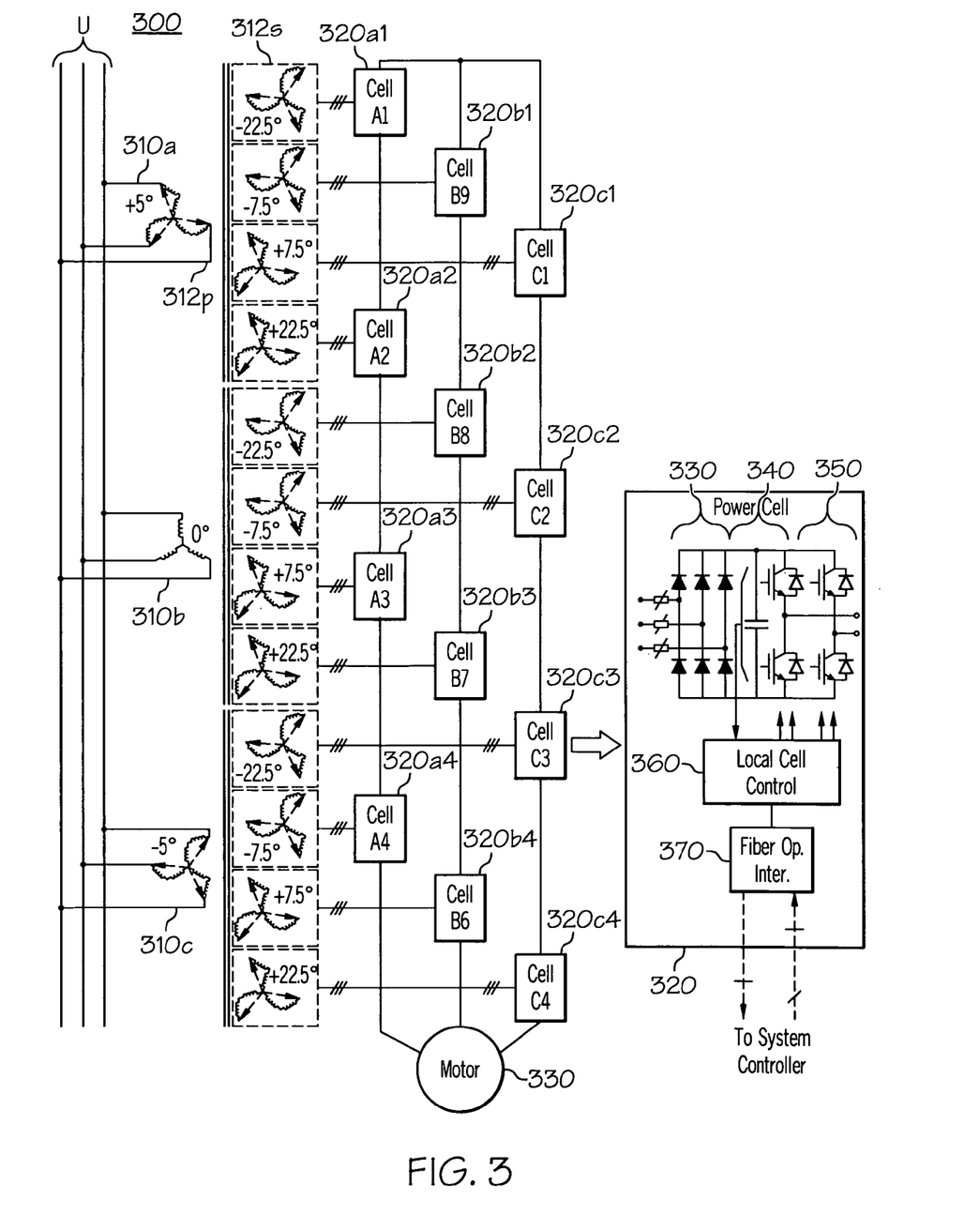
FIG. 3 is a block diagram of a power converter in accordance with yet another embodiment of the present invention.

Referring now to FIG. 3, shown is a block diagram of a power converter in accordance with yet another embodiment of the present invention. As shown in FIG. 3, system 300 includes three modular transformers $310_a$-$310_c$. Each transformer includes a single primary coil $312_p$ and four secondary windings $312_s$. In the implementation shown, the primaries may be Y or extended Y configurations and the secondaries may be extended Y configurations or any other configurations. As shown in the implementation of FIG. 3, at least two secondary windings of each transformer may be coupled to multiple power cells of a single phase output line. For example, two secondary windings of transformer $310_a$ may be coupled to power cells $320_{a1}$ and $320_{a2}$. The remaining two secondary coils of transformer $310_a$ may each be coupled to a respective power cell of the other two phase lines (namely power cells $320_{b1}$ and $320_{c1}$). While shown with this particular implementation, the coils may be connected in any manner to the different power cells. Thus, connections between the secondary windings and the power cells can be interchanged as desired. This is so, as in various implementations the power cells may be of the same configuration and thus may receive power from any given secondary winding. That is, any of power cells 320 can be powered by one or more secondary windings of any of transformers 310 such that complete interchangeability can be realized, as any secondary output (at any phase) from any of the modular transformers can be provided to any given power cell. Interchangeability of power supplies to power cells can be realized by balancing power needed to be supplied to the power cells. In the implementation of FIG. 3, again a 72-pulse transformer is realized by the three modular transformers that power the twelve individual power cells. As described above, each power cell 320 may be adapted the same as described with respect to FIG. 1.

Figure 4:
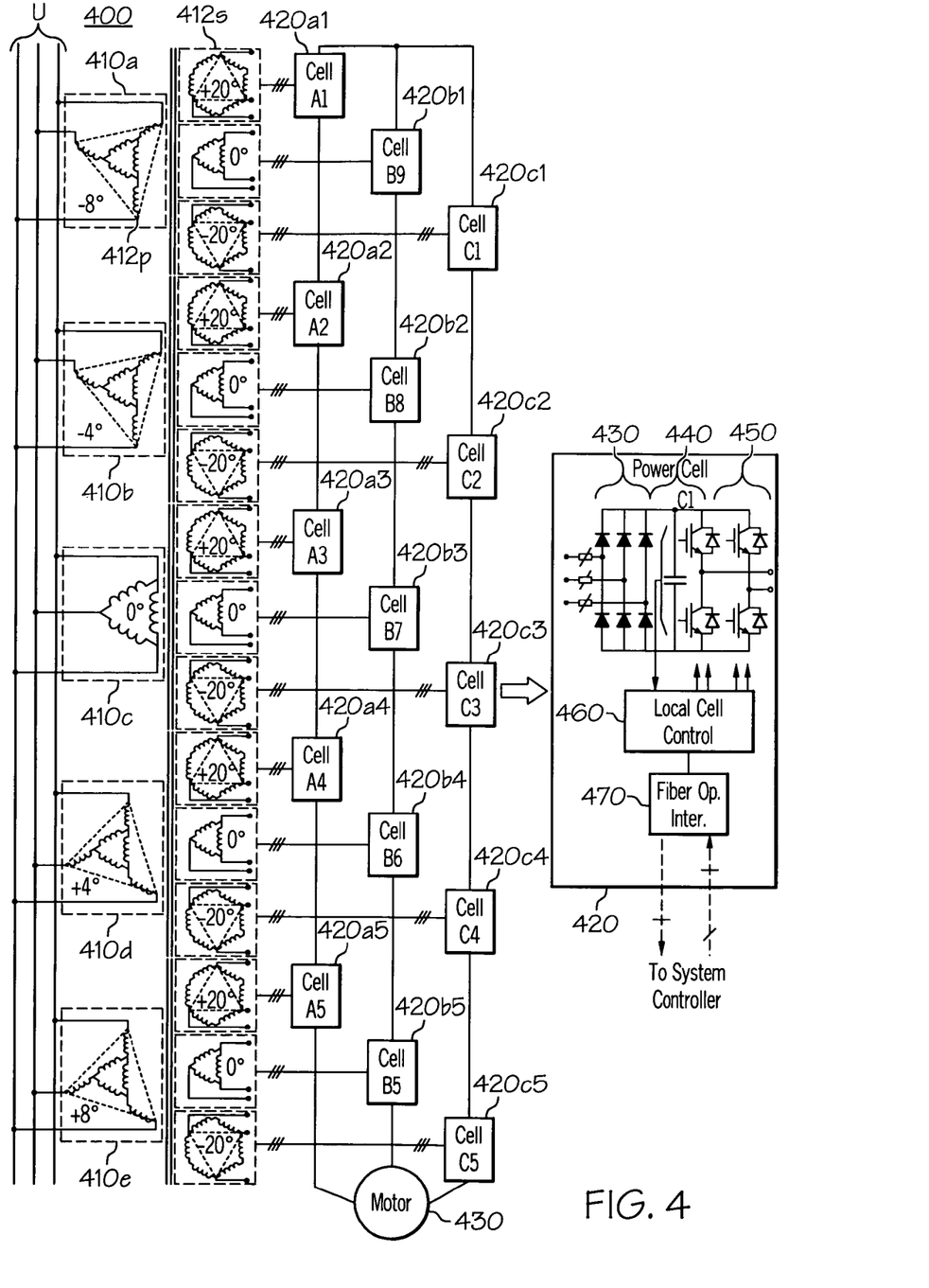
FIG. 4 is a block diagram of even another embodiment of a power converter.

Referring now to FIG. 4, shown is a block diagram of still another embodiment of a power converter. In this implementation five modular transformers $410_a$-$410_e$ may be present, the primary winding $412_p$ of each of which has a phase shift of 4°. In turn, each modular transformer may have three secondary windings $412_s$ having 20° phase shifts. Essentially, system 400 may be arranged similarly to that of FIG. 1, with the addition of two more modular transformers such that 15 isolated DC sources corresponding to power cells $420_{a1}$-$420_{c5}$ can be powered.

Figure 5:
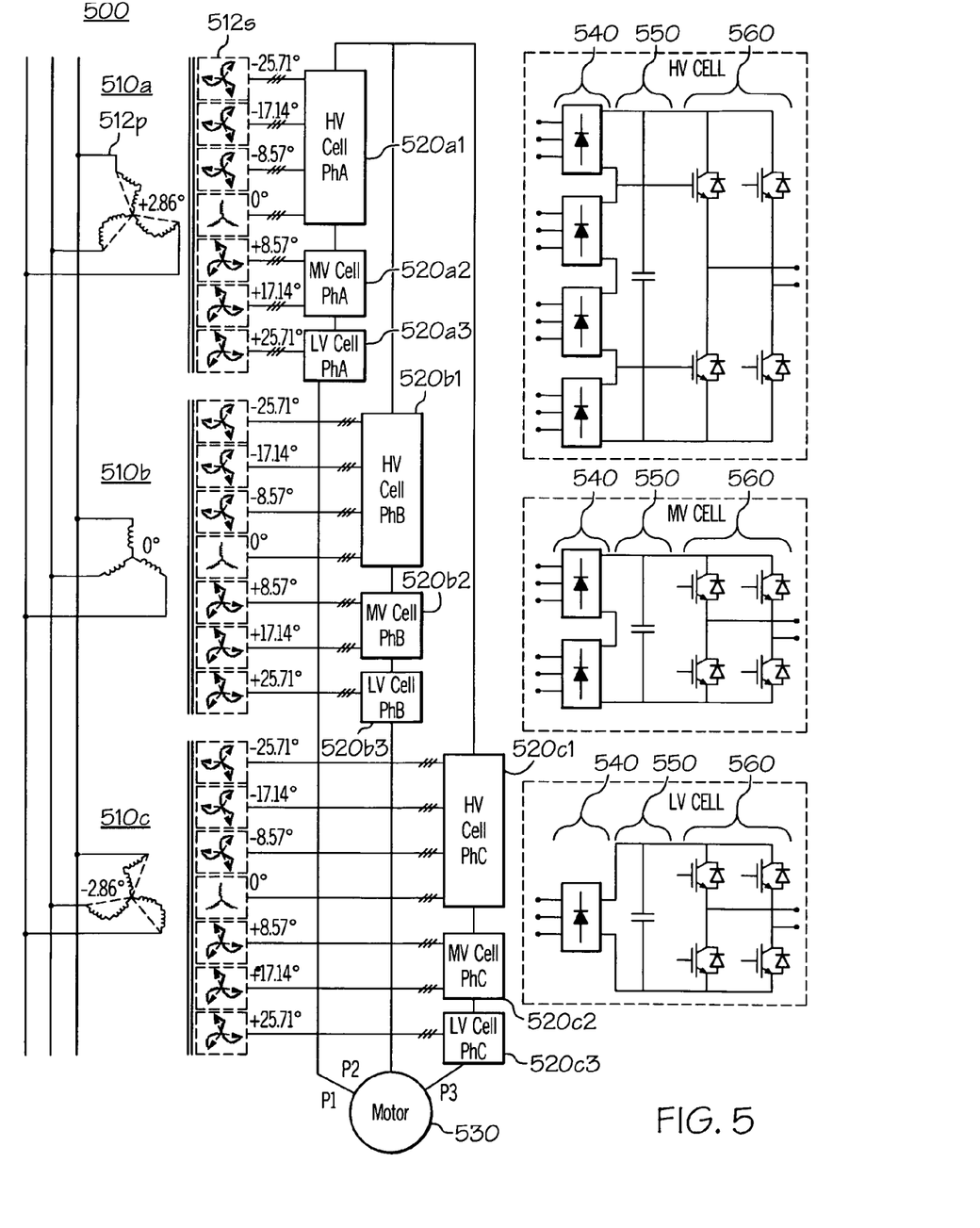
FIG. 5 is a block diagram of an asymmetric power converter in accordance with one embodiment of the present invention.

Embodiments can be also applied to asymmetrical cascaded multilevel inverters. FIG. 5 is a block diagram of an asymmetrical cascaded inverter 500 having three power cells $520_{a1}$-$520_{c3}$ per phase. In FIG. 5 the input power supply to the inverter is implemented by three modular transformers where each transformer $510_a$-$510_c$ has seven secondary windings $512_p$. The total required number of isolated DC sources $N_{dc}$ is 21, so $N_S$ is seven. Then, $\alpha_{sec}=360/42=8.57°$, and $\alpha_{prim}=8.57/3=2.86°$ in accordance with Equations 1-3.

As shown in FIG. 5, the phase-shifted primary windings $512_p$ which may be of Y or extended Y configurations each may be coupled to seven secondary windings $512_s$, which may be formed of Y or extended Y configurations. As shown, multiple secondary windings of each transformer may be coupled to a first power cell of each phase output line, which may be a high voltage cell $520_{a1}$ (and $520_{b1}$ and $520_{c1}$). A smaller number of secondary windings of each transformer may be coupled to a second power cell of each phase output line, which may be a corresponding medium voltage cell $520_{a2}$ (and $520_{b2}$ and $520_{c2}$). Finally, a single secondary winding of each transformer may be coupled to a corresponding low voltage power cell of each phase output line (namely power cells $520_{a3}$-$520_{c3}$). This kind of configuration will generate more voltage levels or less voltage harmonics to the motor. While shown with this particular implementation in the embodiment of FIG. 5, understand that differing amounts of secondary windings of the transformers can be coupled to the different power cells.

FIG. 5 further shows a block diagram for each different asymmetric type of power cell present in the embodiment. As shown, the high voltage cells (e.g., $520_{a1}$) include a rectifier stack 540, a storage stage 550, and a switching stage 560. Note that four series-coupled rectifier diodes are present in this high voltage cell of the embodiment of FIG. 5 to provide the high voltage output. In various implementations, each rectifier diode shown in the schematic view of FIG. 5 can be implemented as a single rectifier diode that can be a half-wave, fall-wave rectifier, or any other topologies. Note that in the embodiment of FIG. 5, each rectifier diode of high voltage cell $520_{a1}$ is coupled to receive incoming power from one set of secondary windings. That is, each rectifier diode is associated with a single secondary winding. By using multiple such rectifier diodes, better power balance can be achieved. In one particular embodiment of a 6600 V medium drive, the high voltage cells may output a voltage of between 0 and 2178 volts. Further, while shown for ease of illustration as a single H-bridge, in some embodiments the high voltage cells may be formed using a multi-level H-bridge configuration, such as a three-level H-bridge configuration. In turn, the medium voltage cells (e.g., as represented by $520_{a2}$) include a similar but smaller rectifier diode stack 540 (where each rectifier diode is still coupled to a single set of secondary windings), storage stage 550, and switching stage 560. In the same particular embodiment of a 6600 V medium voltage drive, the medium voltage cells may output a voltage of between 0 and 1089 volts. The low voltage cells, such as represented by power cell $520_{a3}$ include similar components. However, as shown in FIG. 5 its rectifier stage may be realized using only a single rectifier diode that is coupled to one set of secondary windings, in some embodiments. In one particular embodiment, the low voltage cells may output a voltage of between 0 and 544 volts. So the total voltage supplied to the motor according to FIG. 5 will be 3810 volts per phase or 6600 volts line to line voltage. Thus in the implementation of FIG. 5, relatively smaller modular transformers can be provided at equal voltages, with the number of rectifiers of each voltage level power cell corresponding to the number of sets of secondary windings coupled to that voltage level cell. By using an asymmetrical configuration such as that of FIG. 5, a higher power output may be provided to motor 530. Also, by using multiple power supplies to the power cells and phase shifting in primaries and secondaries, the input current to the drive contains less harmonic components. This power quality of the drive is achieved by cancellation of harmonics components by implementing phase shifting in primary and secondary windings of the transformer modules. While the specific configuration shown in FIG. 5 associates each modular transformer with power cells of a single phase output line, the scope of the present invention is not limited in this regard. Further, while shown as a three-level inverter more or fewer asymmetric levels may be present in a given implementation.

Figure 5A:
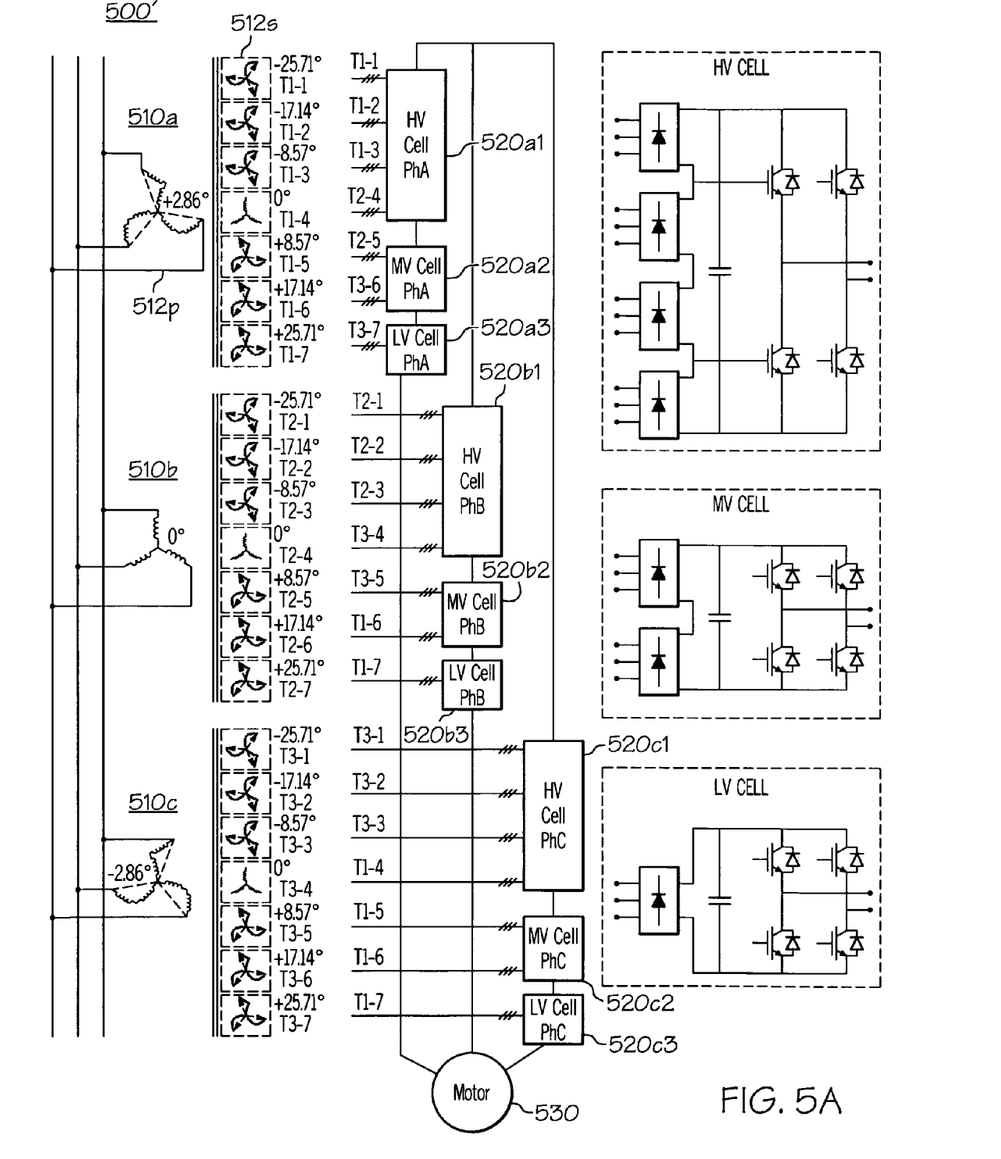
FIG. 5A is a block diagram of an alternate implementation of an asymmetric power converter in accordance with one embodiment of the present invention.

FIG. 5A shows an alternative implementation of an asymmetric inverter 500' using three modular transformers. In this implementation, the secondary sets of windings of each modular transformer has been interchangeably coupled to various ones of the power cells of the three different levels. For example, first level power cell $520_{a1}$ is coupled to secondary sets of windings of both first transformer $510_a$ and second transformer $510_b$. Similarly, second level power cell $520_{a2}$ is coupled to secondary sets of windings of second transformer $510_b$ and third transformer $510_c$. Third level power cell $520_{a3}$ is coupled to a secondary set of windings from third transformer $510_c$. The other phase lines include similarly coupled power cells. While shown with this particular implementation, other implementations may provide for different interchangeable connections between secondary sets of windings of any of the transformers with any of the power cells. Furthermore, understand that while shown in a three-phase system in the embodiment of FIG. 5, asymmetric modular transformers can be used in various multi-phase systems, such as systems having greater than three phases (both at input and output sides) such as a five-phase, six-phase, nine-phase and so forth. In such systems, similar configurations of transformers and power cells can be implemented.

Figure 6:
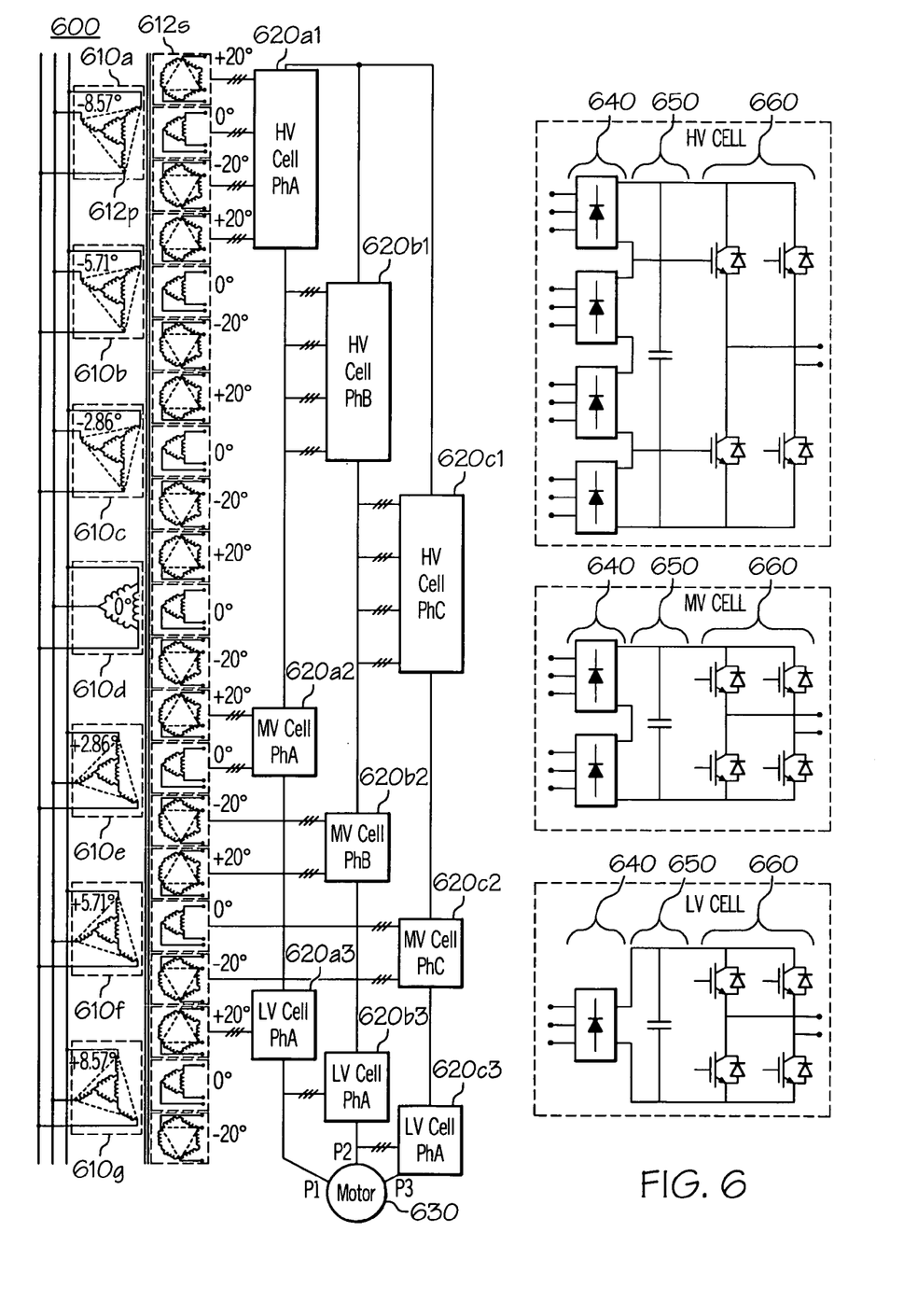
FIG. 6 is a block diagram of an asymmetric power converter in accordance with another embodiment of the present invention.

Referring now to FIG. 6, shown is a block diagram of an asymmetric power converter in accordance with another embodiment of the present invention. As shown in FIG. 6, system 600 includes seven modular transformers $610_a$-$610_g$. The total required number of isolated DC sources ($N_{dc}$) is 21, so $N_S$ is three. Then, $\alpha_{sec}=360/18=20°$, and $\alpha_{prim}=20/7=2.86°$ in accordance with Equations 1-3.

As shown in this implementation, secondary windings 612, of multiple modular transformers can be coupled to the same phase output line.

Specifically, as shown in FIG. 6, system 600 includes power cells of different voltage levels, including a first set of high voltage power cells $620_{a1}$-$620_{c1}$, a second set of medium voltage power cells $620_{a2}$-$620_{c2}$, and a third set of low voltage power cells $620_{a3}$-$620_{c3}$, which are coupled to provide power to a motor 630. As seen, differing number of secondary coils of different transformers are coupled to each of these power cells. In the particular implementation of FIG. 6, modular transformers $610_a$-$610_d$ have secondary windings coupled to the high voltage power cells $620_{a1}$-$620_{c1}$, while modular transformers $610_e$ and $610_f$ have secondary windings coupled to medium voltage power cells $620_{a2}$-$620_{c2}$. Finally, modular transformer $610_g$ has its secondary windings coupled to the low voltage power cells $620_{a3}$-$620_{c3}$. The primary windings $612_p$ of the modular transformers may be formed of delta or extended delta configurations, while the secondary windings $612_s$ may be formed of delta or extended polygon configurations, although the scope of the present invention is not limited in this aspect. As seen in FIG. 6, the configurations of the asymmetric power cells may be the same as those described above with regard to FIG. 5.

Figure 6A:
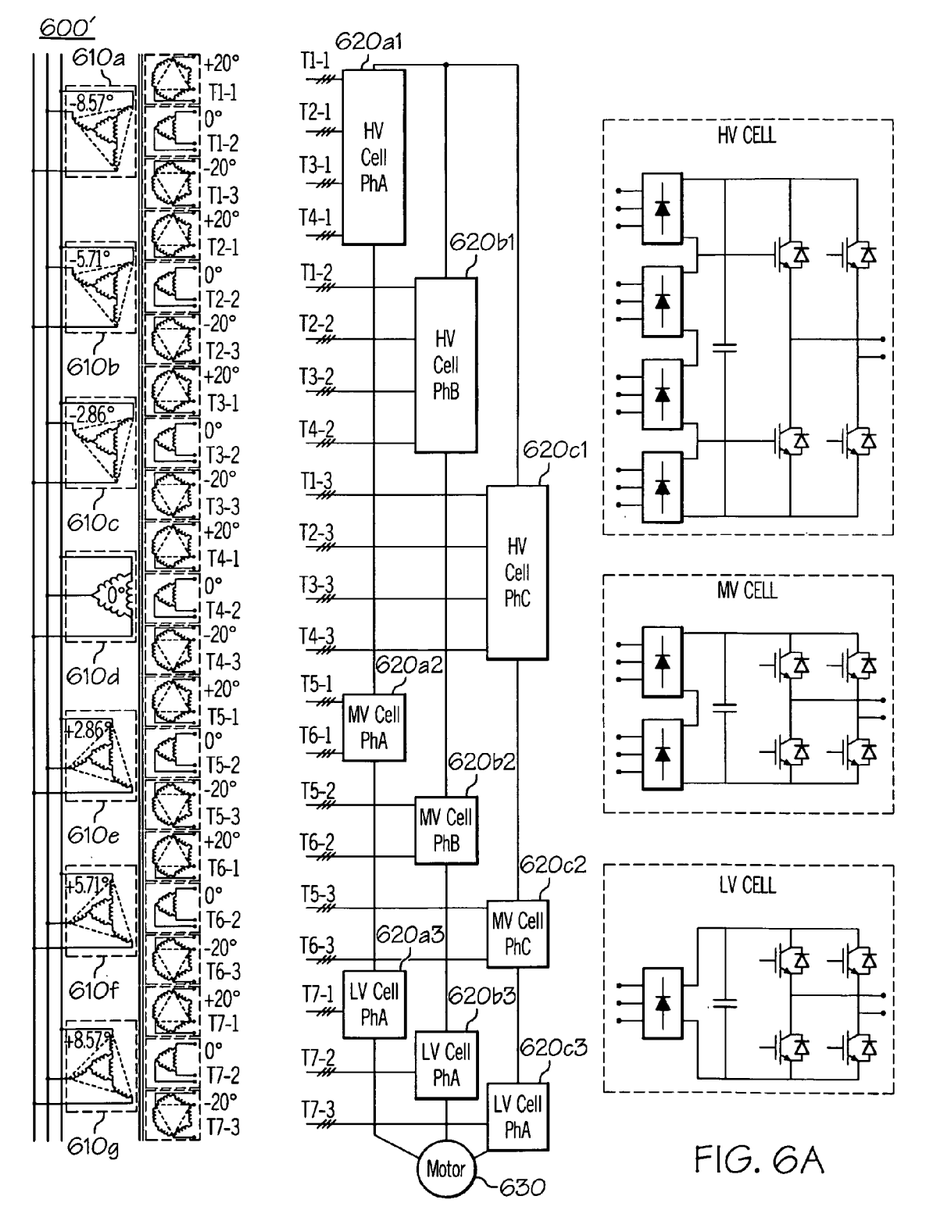
FIG. 6A is a block diagram of an alternate implementation of an asymmetric power converter in accordance with another embodiment of the present invention.

FIG. 6A shows an alternate implementation 600' of the embodiment of FIG. 6, where seven transformers are coupled to the three power level cells of the three phase lines. As shown in the implementation of FIG. 6A, first through fourth transformers $610_a$-$610_d$ are each coupled to first level power cells $620_{a1}$-$620_{a3}$. In turn, fifth and sixth transformers $610_e$-$610_f$ are coupled to second level power cells $620_{a2}$-$620_{c2}$. Finally, seven transformer $510_g$ has a secondary set of windings coupled to each of third level power cells $620_{a3}$-$620_{c3}$. Again, these interchangeable configurations shown in FIG. 6A are for example, and other implementations may be differently configured.

Figure 7:
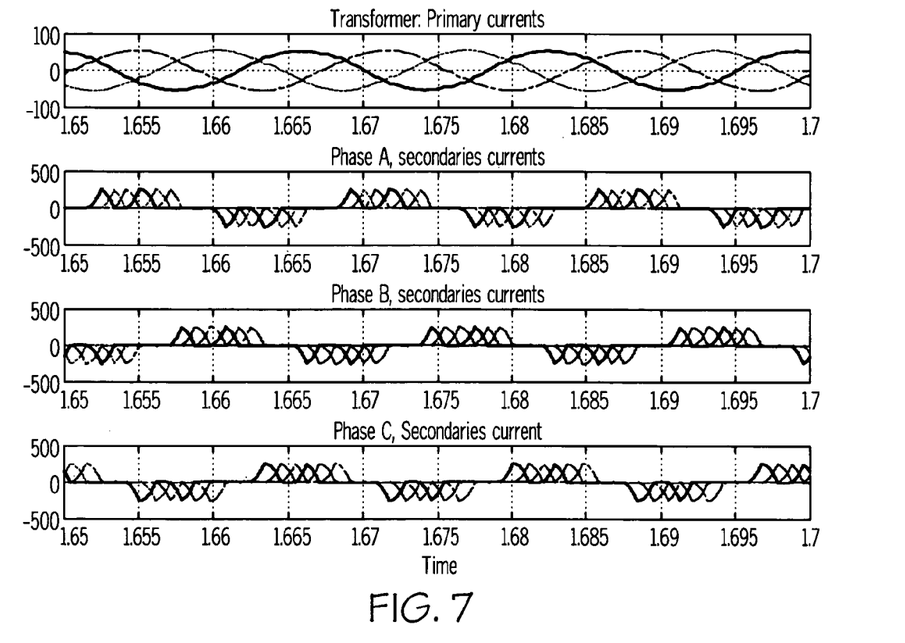
FIG. 7 is a graphical illustration of simulated primary and secondary output currents for the modular transformer of FIG. 1.
Figure 8:
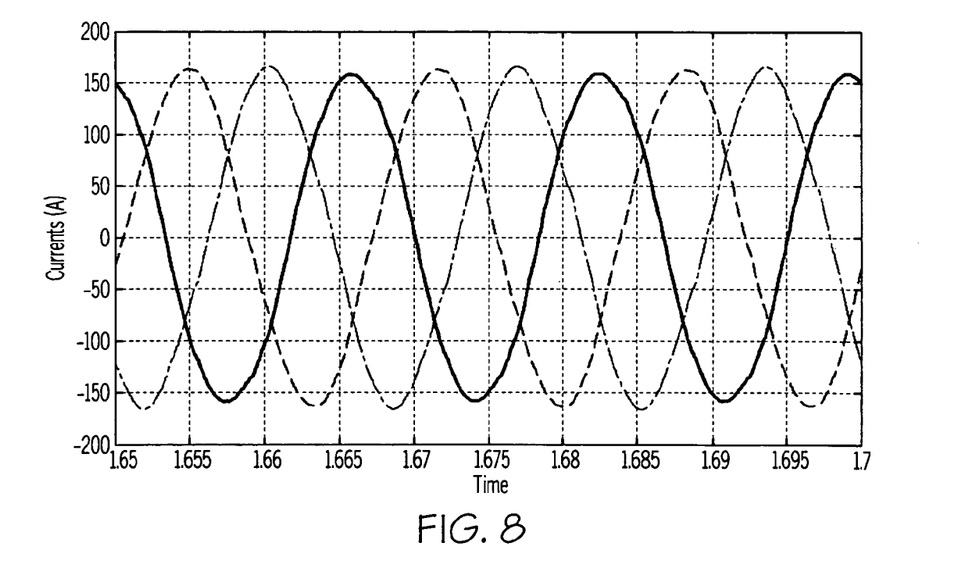
FIG. 8 is a graphical illustration of a simulated input current from a utility connection to the modular transformer.

FIG. 7 shows simulated primary and secondary output currents for transformer 110a of FIG. 1. Values assume a 4160 volt inverter for a 1000 horsepower motor. In turn, FIG. 8 shows a simulated input current from a utility connection to the modular transformers. By providing phase shifting in the primary windings as well as the secondary windings, more harmonics can be cancelled such that the total harmonic distortion (THD) can be lowered. By using modular transformers technology as explained in FIG. 1, the total harmonic distortion of input current to the transformers is about 4.5% which is perfectly agreeable with the requirements of IEEE 519 standard. However, without implementing the phase shift in primaries the total harmonics distortion of input current will stand around 7.1%. These numbers show a significant improvement over a single transformer without phase shifting in primaries. Note the differences in currents between the input currents to the system shown in FIG. 8 and the input current to the primary winding of each modular transformer as shown in FIG. 7. By connecting multiple modular transformers, while more harmonics current is cancelled, power factor is also improved. The primary of each module transformer will carry approximately one third of total input current to the drive. Thus in various embodiments, by providing phase shifted windings on both primary and secondary of the modular transformers where the phase shifting is in accordance with Equations 1-3 above, an optimum harmonic cancellation on the input side to the transformers can be realized. Accordingly, not only are harmonics reduced, but they are reduced to an optimum level, namely as low as possible for a reasonable cost of the transformer implementation.

Figure 9:
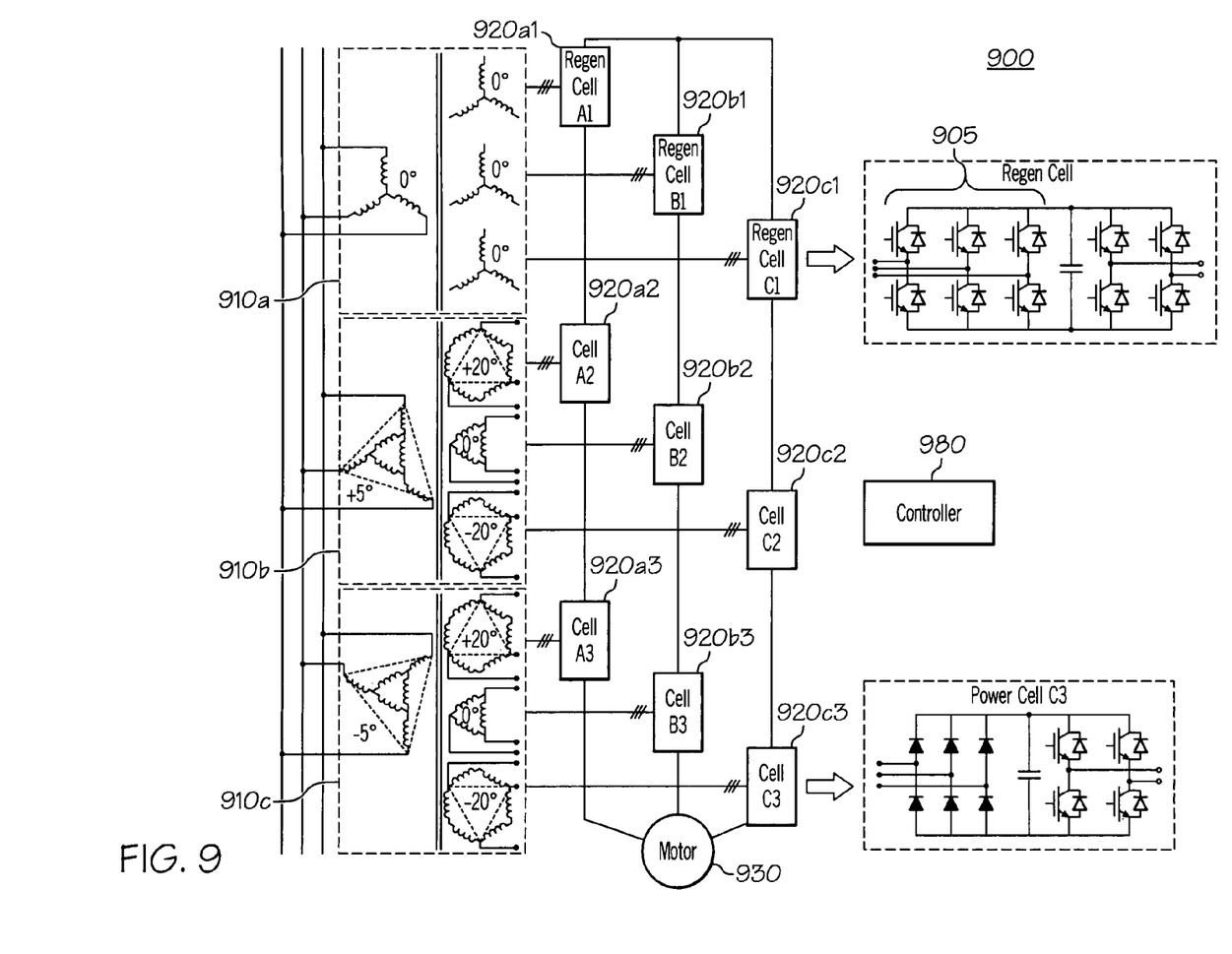
FIG. 9 is a block diagram of an inverter in accordance with yet another embodiment of the present invention.

As mentioned above, in other implementations a combination of active and passive phase shifting can be present in an inverter. Referring now to FIG. 9, shown is a block diagram of an inverter in accordance with yet another embodiment of the present invention. More specifically, FIG. 9 shows an implementation of a symmetrical cascaded medium voltage inverter with partial regeneration capability for a three-phase motor. As shown in FIG. 9, inverter 900 may include modular transformers $910_b$ and $910_c$ with passive phase shifting, realized by both phase shifting of primary windings and secondary windings. Still further, at least one other modular transformer $910_a$ may be provided that is not phase shifted. However, the outputs of this modular transformer may be provided to power cells of a different configuration than the other power cells. Specifically, these power cells $920_{a1}$-$920_{c1}$ may be regenerative power cells having an active front end, e.g., implemented by way of IGBTs 905. When these front end IGBTs are controlled accordingly, a relatively pure sinusoidal current in the main side (i.e., input current to the power cell) having a minimal harmonic distortion is realized.

Nonetheless, the winding sets of the primary and secondary transformer modules $910_b$ and $910_c$ that supply power to the other power cells can be phase shifted to minimize the harmonics in the main current. In this example, $N_{dc}=6$ and $T_T=2$, so $N_s=3$. As $N_{ph}=3$, $\alpha_{prim}=20°$ and $\alpha_{sec}=10$. Thus in the embodiment of FIG. 9, an equivalent 36-pulse transformer can be realized using two 18-pulse transformers $910_b$ and $910_c$ with phase shifted primaries. However, the phase shifting is not needed for the transformers module $910_a$, as the electronically controlled active front-end 905 of the power cell will draw nearly pure sinusoidal current for the utility.

Furthermore, by providing an active front end, this implementation provides the ability for partial regeneration. Of course, other implementations are possible using different combinations of active and passive transformers, as well as control means for actively controlling one or more power cells. Note that in the embodiment of FIG. 9, a controller 980, which may be a local controller or master controller, may be coupled to the power cells (note the connections are not shown in FIG. 9 for ease of illustration). Furthermore, this controller may provide control of the active switching of the front end IGBTs of power cells $920_{a3}$-$920_{c3}$ to enable the clean sine wave output, as well as to enable a partial regeneration mode.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a plurality of transformers each to provide an output to at least one of a plurality of power cells configured to provide AC power to a load, each of the plurality of transformers including:
at least one primary winding and a plurality of secondary windings, wherein the at least one primary winding of each of the transformers is phase shifted with respect to its neighboring transformers, and the plurality of secondary windings are phase shifted with respect to the other secondary windings of the corresponding transformer, wherein the phase shift of the at least one primary winding is based on the phase shift of the secondary windings and a number of the plurality of transformers.

2. The apparatus of claim 1, wherein the apparatus comprises a medium voltage inverter including the plurality of transformers, wherein the medium voltage inverter is a multi-phase system, the multi-phase greater than or equal to three.

3. The apparatus of claim 1, wherein the phase shift of the at least one primary winding is according to $\alpha_{sec}/N_t$, wherein $N_t$ is the number of the plurality of transformers, and $\alpha_{sec}$ corresponds to the phase shift between two of the secondary windings of a corresponding transformer, and is according to $360/2\,N_{ph}\,N_s$, where $N_{ph}$ is a number of phases of a supply to the plurality of transformers and $N_s$ is an integer number of the secondary windings in each of the transformers.

4. The apparatus of claim 3, wherein the number of secondary windings per transformer is according to $N_{dc}/N_t$, wherein $N_{dc}$ is a number of the plurality of power cells coupled to the plurality of transformers.

5. The apparatus of claim 4, wherein the number of the plurality of transformers is three, and wherein the plurality of transformers act as a 54-pulse transformer, wherein each transformer includes three secondary windings each coupled to a corresponding power cell.

6. The apparatus of claim 1, further comprising a non-phase-shifted transformer to provide an output to at least one second power cell.

7. The apparatus of claim 1, wherein multiple secondary windings of a first transformer are coupled to a first power cell and at least one secondary winding of the first transformer is coupled to a second power cell.

8. The apparatus of claim 7, wherein the first power cell and the second power cell are asymmetric, and wherein at least one other secondary winding of the first transformer is coupled to a third power cell.

9. The apparatus of claim 1, wherein all of the plurality of secondary windings of a first transformer are coupled to a first power cell.

10. A system comprising:
a plurality of modular transformers each including at least one phase-shifted primary set of windings to receive power from a utility connection and a plurality of secondary sets of windings; and
a plurality of power cells each coupled to one of the secondary sets of windings of one of the modular transformers, wherein a first subset of the power cells are coupled to a first phase output line, a second subset of the power cells are coupled to a second phase output line, and a third subset of the power cells are coupled to a third phase output line, and wherein each modular transformer provides an output to a first number of power cells of a pair of the three phase output lines and a second number of power cells of a last of the phase output lines, wherein the first number is different than the second number and the second number is greater than the first number and wherein any of the plurality of power cells can be coupled to any of the secondary sets of windings of any of the plurality of modular transformers.

11. The system of claim 10, wherein each modular transformer provides the output to the first number of power cells of a different pair of the three phase output lines.

12. The system of claim 11, wherein a first modular transformer is to provide outputs to a first power cell of the first phase output line and the second phase output line, and to a first power cell and a second power cell of the third phase output line.

13. The system of claim 10, wherein a phase shift of the phase-shifted primary set of windings is according to $\alpha_{sec}/N_t$, wherein $N_t$ is the number of the plurality of modular transformers, and $\alpha_{sec}$ corresponds to a phase shift of the secondary sets of windings of a corresponding modular transformer, and is based on a number of phases of the utility connection coupled to the modular transformers and the number of secondary sets of windings per modular transformer, which in turn is based on a total number of the power cells and $N_t$.

14. The system of claim 13, wherein $\alpha_{sec}$ is according to $360/2\,N_{ph}\,N_s$, where $N_{ph}$ is a number of phases of the utility connection to the plurality of modular transformers and $N_s$ is an integer number of the secondary sets of windings in each of the modular transformers.

15. The system of claim 14, wherein each modular transformer includes four secondary sets of windings having a phase shift of 15° therebetween.

16. The system of claim 15, wherein the secondary sets of windings of each modular transformer having a phase shift of 45° therebetween are coupled to the last phase output line.

17. A system comprising:
a plurality of transformers each to provide an output to at least one of a plurality of power cells coupled to at least one phase output line and configured to provide AC power to a load, each of the plurality of transformers including at least one primary winding and a plurality of secondary windings, wherein the primary winding of each of the transformers is phase shifted with respect to its neighboring transformers, the plurality of secondary windings are phase shifted with respect to the other secondary windings of the corresponding transformer and the phase shift of the primary windings is based on the phase shift of the secondary windings and a number of the plurality of transformers; and
a non-phase-shifted transformer to provide an output to at least one second power cell coupled to the at least one phase output line, wherein at least one second power cell is configured to perform partial regeneration from the load.

18. The system of claim 17, wherein the at least one second power cell includes an active front end coupled to an output of the one of the plurality of secondary windings.

19. The system of claim 17, further comprising a controller to control switching of an active front end of the at least one second power cell.

* * * * *